(12) United States Patent
Frey

(10) Patent No.: US 6,672,182 B2
(45) Date of Patent: Jan. 6, 2004

(54) PROCESS FOR MANUFACTURING A CIRCULAR SAW BLADE AND CIRCULAR SAW BLADE MADE THEREBY

(75) Inventor: Lambert Frey, Getzersdorf (AT)

(73) Assignee: Böhler Miller Messer und Sägen GmbH, Böhlerwerk (AU)

( * ) Notice: Subject to any disclaimer, the term of this patent is extended or adjusted under 35 U.S.C. 154(b) by 128 days.

(21) Appl. No.: 10/066,704

(22) Filed: Feb. 6, 2002

(65) Prior Publication Data

US 2003/0041694 A1 Mar. 6, 2003

(30) Foreign Application Priority Data

Jul. 3, 2001 (AT) .......................................... 1034/2001

(51) Int. Cl.[7] .......................... B23D 63/00; B27B 33/08
(52) U.S. Cl. ........................................... 76/112; 83/835
(58) Field of Search ................................ 76/112, 101.1; 83/676, 835, 838

(56) References Cited

U.S. PATENT DOCUMENTS 3,812,755 A * 5/1974 Danielsen ..................... 83/835
3,990,338 A * 11/1976 Wikner et al. ................. 83/835
4,106,382 A * 8/1978 Salje et al. .................... 83/835
6,158,323 A * 12/2000 Asada .......................... 93/835

FOREIGN PATENT DOCUMENTS

| DE | 30 30 027 A1 | * | 8/1980 |
| DE | 33 10 247 A1 | * | 3/1983 |
| DE | 4405475 |   | 8/1994 |

OTHER PUBLICATIONS

English Abstract DE 4405475.
European Industrial Standard EN ISO 4287, Oct. 1998.
European Industrial Standard EN ISO 4288, Apr. 1998.
German Industrial Standard DIN 4762, Jan. 1989.

* cited by examiner

Primary Examiner—Hwei-Siu Payer
(74) Attorney, Agent, or Firm—Greenblum & Bernstein, P.L.C.

(57) ABSTRACT

Process for manufacturing a circular saw blade and a saw blade obtainable by the process. At least two congruent metal blades of an iron-based alloy are glued together and the inner and outer lateral surfaces thereof are treated to provide roughness values within certain limits.

39 Claims, 1 Drawing Sheet

PROCESS FOR MANUFACTURING A CIRCULAR SAW BLADE AND CIRCULAR SAW BLADE MADE THEREBY

CROSS-REFERENCE TO RELATED APPLICATIONS

The present application claims priority under 35 U.S.C. §119 of Austrian Patent Application No. 1034/2001, filed on Jul. 3, 2001, the disclosure of which is expressly incorporated by reference herein in its entirety.

BACKGROUND OF THE INVENTION

1. Field of the Invention

The present invention relates to a process for manufacturing a circular saw blade by gluing at least two congruent metal blades of an iron-based alloy. The present invention also relates to a circular saw blade obtainable by that process.

2. Discussion of Background Information

One-piece circular saw blades are set in vibration during high-power operation of the saw and, as a result, often cause considerable noise pollution. It is known to achieve a distinct reduction in the emitted airborne noise level by using a sandwich-like structure of the master blade. In this connection, at least two round lateral plates are connected to one another at least in parts thereof, thereby forming a master blade, and cutting tips or cutting segments are arranged circumferentially thereon. Connecting the lateral plates, if necessary via a center plate, can be accomplished metallically, by soldering as well as by spot welding or by gluing.

When joining by gluing, two congruent metallic blades are placed on top of one another with an intermediate layer of a thin adhesive layer placed therebetween, whereafter the adhesive is allowed to harden, in particular, thermally. In doing so, it can be advantageous, as shown by DE 44 05 475, if gluing the parts takes place only in the radial area at a distance from the circumference of the saw blade.

The vibrations of the saw blade that still occur in a muffled manner despite the sandwich structure as well as the changing or pulsating mechanical stresses in a high-performance operation can produce at least partial disintegration of the lateral blades. Studies have shown that, starting from a defect that is often small in terms of area, separations of adhesive from a blade in many cases occur in the area of the half radius of the saw blade, which then enlarge in a conchiform manner and ultimately lead to the drift of the pitch circle of the cutting segments or cutting tips, respectively, in an axial direction during saw operation and/or to the same breaking off from the master blade. As a result, the durability in operation of the individual saw blades may be quite different, which is particularly disadvantageous if several saw blades are mounted on a shaft to generate a cut.

SUMMARY OF THE INVENTION

The present invention eliminates the disadvantages of varying durability and/or disintegration of the lateral blades and provides a glued saw blade that has improved service characteristics. More particularly, the invention provides crack initiation-free gluing of at least two metal blades which results in a circular saw master blade with improved rotational accuracy.

In one aspect, the present invention provides a process for the manufacture of a circular saw blade by gluing together at least two congruent metal blades of an iron-based alloy. In this process, at least two circular-saw-shaped metal blades made from heat-treated sheet material of iron-based alloy are provided and partially plastically deformed all around in the area of their half radius. The inner lateral surfaces of the metal blades are treated to provide them with a roughness according to EN ISO 4287 and EN ISO 4288 (DIN 4762) represented by a maximum profile height $R_z$ of about 3.0 to about 7.0 µm and an arithmetic mean roughness index $R_a$ of about 0.30 to about 0.75 µm. An adhesive is applied onto the inner lateral surface of at least one of the metal blades and the metal blades are combined with their inner lateral surfaces facing each other to form a sandwich structure. The adhesive is thermally hardened while applying pressure to the sandwich structure. Additionally, the outer lateral surfaces of the metal blades are treated to provide them with a surface roughness represented by a maximum profile height $R_z$ of about 5 to about 10 µm.

According to another aspect, the saw blade may have slots and/or teeth in the area of its outer circumference and the above process further comprises securing cutting segments (e.g., diamond segments) and/or cutting tips to circumferential surfaces between said slots and/or teeth. The cutting segments and/or cutting tips may be secured by metallic bonding, for example, soldering and/or welding.

According to another aspect of the above process, the adhesive is applied at a thickness of about 0.03 to about 0.06 mm, measured from the center line (m) of the roughness profile of the inner lateral surface.

In yet another aspect, the thermal hardening of the adhesive is carried out in two stages. For example, a first stage of the thermal hardening comprises heating at a temperature ranging from about 50° C. to about 70° C. and under a pressure ranging from about 1 to about 3 kg/cm². This first stage may be carried out for about 10 to about 16 minutes. The second stage of the thermal hardening may, for example, comprise heating at a temperature ranging from about 140° C. to about 160° C. to complete the hardening of the adhesive.

The inner lateral surfaces may be treated to provide the desired roughness either before or after the treatment of the outer lateral surfaces. For example, the outer lateral surfaces may be treated prior to the partial plastic deforming of the metal blades.

According to still another aspect of the process of the present invention, both the inner lateral surfaces and the outer lateral surfaces of the metal blades may independently be treated by circular polishing and/or brush polishing.

According to another aspect of the present process, the metal blades may be made from the heat-treated sheet material by a thermal cutting operation, e.g., by laser cutting.

Furthermore, in another aspect, the metal blades may be subjected to a tempering treatment prior to the partial plastic deforming. The tempering treatment may, for example, be carried out at a temperature ranging from about 380° C. to about 480° C.

According to another aspect of the present invention, the iron-based alloy may comprise, in weight percent:

| | | |
|---|---|---|
| about 0.6 | to | about 0.9 C |
| about 0.15 | to | about 0.7 Si |
| 0 | to | about 1.0 Mn and |
| about 0.20 | to | about 0.60 Cr, | the balance being iron and incidental impurities, with the contents of phosphorus and sulfur each not exceeding about 0.03 percent by weight. This is particularly advantageous if the saw blade has slots and/or teeth in the area of its outer circumference and the above process further comprises soldering cutting segments and/or cutting tips to circumferential surfaces between said slots and/or teeth.

According to yet another aspect, the iron-based alloy may comprise, in weight percent:

| about 0.18 | to | about 0.35 C |
| 0 | to | about 0.50 Si |
| 0 | to | about 1.40 Mn |
| about 0.30 | to | about 1.55 Cr and |
| 0 | to | about 0.40 Mo, | the balance being iron and incidental impurities, with the contents of phosphorus and sulfur each not exceeding about 0.03 percent by weight. This is particularly advantageous if the saw blade has slots and/or teeth in the area of its outer circumference and the above process further comprises welding (e.g., by laser welding) cutting segments and/or cutting tips to circumferential surfaces between said slots and/or teeth.

In yet another aspect of the process of the present invention, the metal blades are partially plastically deformed by roller-burnishing.

The present invention also provides, in another aspect, a process for the manufacture of a circular saw blade by gluing together at least two congruent metal blades of an iron-based alloy. This process comprises, in the given order:

providing at least two circular-saw-shaped metal blades cut thermally from heat-treated sheet material of iron-based alloy which comprises, besides iron and incidental impurities, at least about 0.18 weight percent C and at least about 0.20 weight percent Cr;

tempering the metal blades at a temperature ranging from about 380° C. to about 480° C.;

partially plastically deforming the metal blades all around in the area of their half radius by roller-burnishing;

treating the inner lateral surfaces of the metal blades by brush polishing and/or circular polishing to provide them with a roughness according to EN ISO 4287 and EN ISO 4288 (DIN 4762) represented by a maximum profile height $R_z$ of about 3.0 to about 7.0 µm and an arithmetic mean roughness index $R_a$ of about 0.30 to about 0.75 µm;

applying an adhesive onto the inner lateral surface of at least one of the metal blades at a thickness of from about 0.03 to about 0.06 mm, measured from the center line (m) of the roughness profile of the inner lateral surface;

congruently combining the metal blades with their inner lateral surfaces facing each other to form a sandwich structure;

thermally hardening the adhesive by heating it, in a first hardening stage, at a temperature ranging from about 50° C. to about 70° C. and a pressure ranging from about 1 to about 3 kg/cm² for a period of about 10 to about 16 minutes, cooling it to ambient temperature, and heating it again, in a second stage, at a temperature ranging from about 140° C. to about 160° C. to complete the hardening of the adhesive; and treating the outer lateral surfaces of the metal blades by brush polishing and/or circular polishing to provide them with a surface roughness represented by a maximum profile height $R_z$ of about 5 to about 10 µm.

In this process, the saw blade may have slots and/or teeth in the area of its outer circumference and cutting segments and/or cutting tips may be secured to circumferential surfaces between said slots and/or teeth, e.g., by metallic bonding (such as soldering and/or welding).

In another aspect, the present invention provides a circular saw blade obtainable by the above processes.

BRIEF DESCRIPTION OF THE DRAWINGS

The present invention is further described in the detailed description which follows, with reference to the noted plurality of drawings wherein.

DETAILED DESCRIPTION OF THE PRESENT INVENTION

Figure 1:
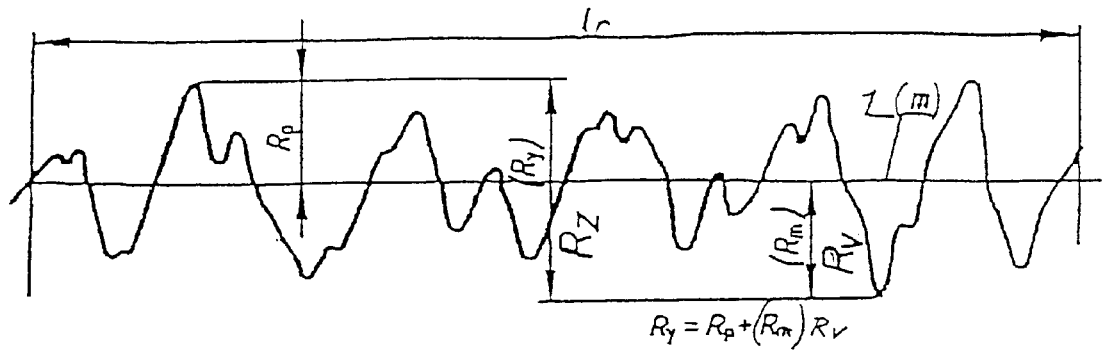
FIG. 1 is a representation of a surface roughness profile.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

According to the process of the present invention at least two metal blades of circular-saw-shape are made from heat-treated, thin sheet material and are partially plastically deformed all around in the area of the half radius by so-called roller-burnishing. Thereafter the lateral surfaces that are to be glued together are provided with a roughness which according to standards EN ISO 4287 and EN ISO 4288 (DIN 4762) is represented by a maximum profile height $R_z$ ($R_y$) of about 3.0 to about 7.0 µm and an arithmetic mean roughness index $R_a$ of about 0.30 to about 0.75 µm. Then the so processed lateral surfaces of the circular-saw-shaped metal blades are coated with adhesive and the adhesive is subjected to a two-stage thermal hardening process under pressure. This is followed by a processing of the lateral outside surface of the glued circular saw blade or master blade to a surface roughness with a maximum profile height $R_z$ of about 5 to about 10 µm, whereafter a metallic bonding of the circumferential intermediate slot surfaces or teeth with cutting tips or diamond segments is effected.

The advantages achieved by the process according to the present invention essentially are that, on the one hand, the pitch circle of the cut-generating cutting elements that are connected with the master blade is stabilized, even when the circular saw is subjected to high mechanical and thermal stress, so that thin cuts can be achieved economically and with high power and, on the other hand, the adhesive bond does not show any kind of crack initiation to result in so-called conchiform disintegration surfaces, thereby providing a durable connection of the lateral blades.

In order to stabilize the pitch circle of the cut-generating elements it is important to partially plastically deform both metal blades, coordinated with the adhesive connection, in the area of the half radius and to thereby generate tensile stress in the external area of the master blade. Moreover, according to the invention, in order to safely achieve high fatigue strength of the glued connection of the two lateral blades with a thermosetting adhesive, for example a urea methacrylate or the like, it is necessary to set the roughness of the surfaces of the lateral blades to be glued together at a maximum profile height $R_Z$ ($R_Y$) from about 3.0 to about 7.0 µm and an arithmetic mean roughness index $R_a$ from about 0.30 to about 0.75 µm. In the case of maximum profile heights exceeding about 7.0 µm, crack initiation points appear erratically between metal and adhesive, particularly in the area of the half radius of the master blade. The cause thereof, which has not yet been clarified completely, may lie in too deep, possibly adhesive-free profile valleys if the height difference $R_Z$ of the profile is larger than about 7.0 µm. On the other hand, if the surfaces to be glued together are treated such that the roughness is set at a maximum profile height of less than about 3 µm, the adhesion of the adhesive to the smooth surfaces can be weaker than required for withstanding the occurring shear stresses. Accordingly, the profile height $R_Z$ according to the invention ranges from about 3.0 µm to about 7.0 µm.

It has been found that not only is the profile height $R_Z$ of the roughness essential for the adhesion of the glued bond, but also that the arithmetic mean value of the absolute values of the profile deviations is of great significance for the strength of the bond between the two lateral surfaces. If processing of the gluing surfaces of the lateral blades takes place in such a way that a mean roughness index $R_a$ of about 0.75 µm is exceeded, the formation of crack initiation points is promoted. If, on the other hand, the value of the mean roughness index $R_a$ of the surfaces of the lateral blades to be glued is lower than about 0.3 µm, the adhesive strength may become so low that disintegration of the master blade takes place.

In order to minimize chip adhesion and the tendency of the chips to stick to the outer lateral surfaces of the master blade in the case of thin saw cuts and to secure as low as possible a fiction during cut formation, in accordance with the invention processing of the external surfaces is to be conducted so as to result in a roughness having a maximum profile height $R_Z$ ($R_Y$) in the range from about 5 µm to about 10 µm. Profile heights of the external lateral surfaces in excess of about 10 µm may cause coarser chips to be drawn into the saw gap, which may result in jamming of the saw blade and/or increased friction. Profile heights $R_Z$ below 5 µm, on the other hand, may promote adhesion of fine chip material, which increases the tendency of the saw blade to jam. In order to largely prevent increased friction which frequently leads to excessive heating of the master blade, according to the present invention the roughness of the external lateral surfaces of the saw blade is adjusted to a profile height $R_Z$ in the range from about 5 µm to about 10 µm.

An increased secure connection with high mechanical strength properties can be achieved by coating the metal blades' processed lateral surfaces to be glued together with a thermosetting adhesive in a thickness of about 0.03 to about 0.06 mm, measured from the centerline of the roughness profile, arranging the blades congruently on one another, prehardening the glue in a first stage at a temperature of about 50° C. to about 70° C. and a pressure of about 1 to about 3 kg/cm² for about 10 to about 16 minutes, and bringing the blades to room temperature and aligning them, if necessary, whereafter complete hardening of the adhesive takes place at a temperature of about 140° C. to about 160° C.

Roughness values according to the invention can be achieved in a particularly economical manner and with good quality if the processing of the lateral surfaces is carried out by way of brush polishing or circular polishing.

High-quality base parts of the master blade can be provided advantageously in a cost-effective manner if the metal blades are made from the rough material by thermal fusion cutting, for example laser cutting, and if, prior to further processing, the metal blades are subjected to an annealing treatment, for example, in a temperature range from about 380° C. to about 480° C. As a result, increased material toughness can be achieved also in the zones adjacent to the cut.

Also, a highly durable metallic bonding between the cutting parts is achievable if the circular saw blade or master blade, respectively, is formed of an alloy of, in percent by weight, of:

| | | |
|---|---|---|
| about 0.6 | to | about 0.9 C |
| about 0.15 | to | about 0.7 Si |
| 0 | to | about 1.0 Mn and |
| about 0.20 | to | about 0.60 Cr, | the balance being iron and incidental impurities, with the contents of phosphorus and sulfur each not exceeding about 0.03 percent by weight, and if, additionally, the metallic bonding between the cutting tips or diamond segments and the master blade is provided by soldering.

Furthermore, in particular for selected materials to be sawed, a favorable saw blade with preferred performance characteristics can be achieved if the circular saw blade or master blade, respectively, is formed of an alloy of, in percent by weight, of:

| | | |
|---|---|---|
| about 0.18 | to | about 0.35 C |
| 0 | to | about 0.50 Si |
| 0 | to | about 1.40 Mn |
| about 0.30 | to | about 1.55 Cr and |
| 0 | to | about 0.40 Mo | the balance being iron and incidental impurities, with the contents of phosphorus and sulfur each not exceeding about 0.03 percent by weight, and if, additionally, the metallic bonding between the cutting tips or diamond segments and the master blade is provided by welding, in particular, laser welding.

Two representations of roughness taken from the standard specifications sheets are reproduced in the following with reference to FIGS. 1 and 2 to illustrate some of the characteristics of the invention.

Figure 2:
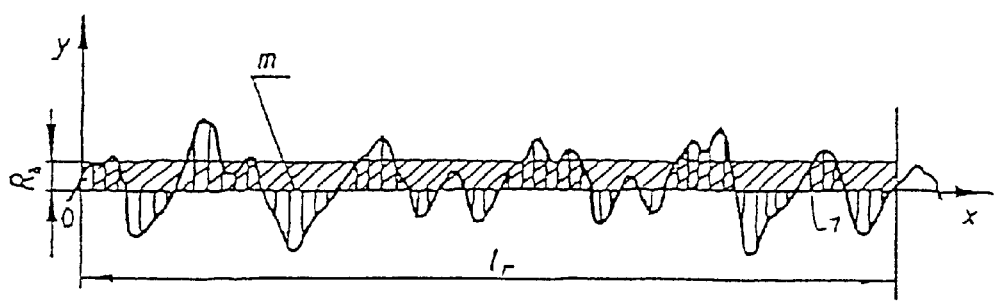
FIG. 2 is a representation of a cross-sectional profile with the arithmetic mean roughness index.

FIG. 1 shows a cross-sectional profile in the area of the surface across the length 1 of an object in accordance with standard EN ISO 4287 (DIN 4762). The maximum height of the profile or the maximum profile height $R_Z$ ($R_Y$) is represented by the sum of the height of the highest profile peak $R_P$ and the depth of the deepest profile valley $R_V$ with respect to the center line (1). The arithmetic mean value of the profile ordinates or the arithmetic mean value $R_a$, respectively, is represented in principle in FIG. 2. $R_a$ represents the arithmetic mean value of the absolute values of the profile deviations across the reference length 1.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for the manufacture of a circular saw blade by gluing together at least two congruent metal blades of an iron-based alloy, comprising:

providing at least two circular-saw-shaped metal blades made from heat-treated sheet material of iron-based alloy, each metal blade having an outer lateral surface and an inner lateral surface;

partially plastically deforming the metal blades all around in the area of their half radius;

treating the inner lateral surfaces of the metal blades to provide them with a roughness according to EN ISO 4287 and EN ISO 4288 (DIN 4762) represented by a maximum profile height $R_z$ of 3.0 to 7.0 µm and an arithmetic mean roughness index $R_a$ of 0.30 to 0.75 µm;

applying an adhesive onto the inner lateral surface of at least one of the metal blades;

combining the metal blades with their inner lateral surfaces facing each other to form a sandwich structure;

thermally hardening the adhesive while applying pressure to the sandwich structure; and treating the outer lateral surfaces of the metal blades to provide them with a surface roughness represented by a maximum profile height $R_z$ of 5 to 10 µm.

2. The process of claim 1, wherein the saw blade has at least one of slots and teeth in the area of its outer circumference and wherein the process further comprises securing cutting elements selected from cutting segments, cutting tips and combinations thereof to circumferential surfaces between said at least one of slots and teeth.

3. The process of claim 2, wherein the cutting elements are secured by metallic bonding.

4. The process of claim 3, wherein said metallic bonding comprises at least one of soldering and welding.

5. The process of claim 2, wherein said cutting segments comprise diamond segments.

6. The process of claim 1, wherein the adhesive is applied at a thickness of 0.03 to 0.06 mm, measured from a center line of a roughness profile of the inner lateral surface.

7. The process of claim 1, wherein the thermal hardening of the adhesive is carried out in two stages.

8. The process of claim 7, wherein a first stage of the thermal hardening comprises heating at a temperature ranging from 50° C. to 70° C. and under a pressure ranging from 1 to 3 kg/cm².

9. The process of claim 8, wherein the first stage is carried out for 10 to 16 minutes.

10. The process of claim 8, wherein a second stage of the thermal hardening comprises heating at a temperature ranging from 140° C. to 160° C. to complete the hardening of the adhesive.

11. The process of claim 1, wherein the inner lateral surfaces are treated prior to the outer lateral surfaces.

12. The process of claim 11, wherein the inner lateral surfaces are treated by brush polishing.

13. The process of claim 12, wherein the outer lateral surfaces are treated by brush polishing.

14. The process of claim 11, wherein the inner lateral surfaces are treated by circular polishing.

15. The process of claim 14, wherein the outer lateral surfaces are treated by circular polishing.

16. The process of claim 1, wherein the outer lateral surfaces are treated prior to the inner lateral surfaces.

17. The process of claim 1, wherein the outer lateral surfaces are treated prior to the partial plastic deforming.

18. The process of claim 1, wherein the metal blades are made from the heat-treated sheet material by a thermal cutting operation.

19. The process of claim 18, wherein the thermal cutting operation comprises laser cutting.

20. The process of claim 1, wherein prior to the partial plastic deforming, the metal blades are subjected to a tempering treatment.

21. The process of claim 20, wherein the tempering treatment is carried out at a temperature ranging from 380° C. to 480° C.

22. The process of claim 1, wherein the iron-based alloy comprises, in weight percent:

| 0.6 | to | 0.9 C |
| 0.15 | to | 0.7 Si |
| 0 | to | 1.0 Mn and |
| 0.20 | to | 0.60 Cr, | the balance being iron and incidental impurities, with the contents of phosphorus and sulfur each not exceeding 0.03 percent by weight.

23. The process of claim 22, wherein the saw blade has at least one of slots and teeth in the area of its outer circumference and wherein the process further comprises soldering cutting elements selected from cutting segments, cutting tips and combinations thereof to circumferential surfaces between said at least one of slots and teeth.

24. The process of claim 1, wherein the iron-based alloy comprises, in weight percent:

| 0.18 | to | 0.35 C |
| 0 | to | 0.50 Si |
| 0 | to | 1.40 Mn |
| 0.30 | to | 1.55 Cr and |
| 0 | to | 0.40 Mo, | the balance being iron and incidental impurities, with the contents of phosphorus and sulfur each not exceeding 0.03 percent by weight.

25. The process of claim 24, wherein the saw blade has at least one of slots and teeth in the area of its outer circumference and wherein the process further comprises welding cutting elements selected from cutting segments, cutting tips and combinations thereof to circumferential surfaces between said at least one of slots and teeth.

26. The process of claim 25, wherein the welding comprises laser welding.

27. The process of claim 1, wherein the of the metal blades are partially plastically deformed by roller-burnishing.

28. A process for the manufacture of a circular saw blade by gluing together at least two congruent metal blades of an iron-based alloy, comprising, in the given order:

providing at least two circular-saw-shaped metal blades cut thermally from heat-treated sheet material of iron-based alloy which comprises, besides iron and incidental impurities, at least 0.18 weight percent C and at least 0.20 weight percent Cr, each metal blade having an outer lateral surface and an inner lateral surface;

subjecting the metal blades to a tempering treatment at a temperature ranging from 380° C. to 480° C.;

partially plastically deforming the metal blades all around in the area of their half radius by roller-burnishing;

treating the inner lateral surfaces of the metal blades by at least one of brush polishing and circular polishing to provide them with a roughness according to EN ISO 4287 and EN ISO 4288 (DIN 4762) represented by a maximum profile height $R_z$ of 7.0 to 7.0 μm and an arithmetic mean roughness index $R_a$ of 0.30 to 0.75 μm;

applying an adhesive onto the inner lateral surface of at least one of the metal blades at a thickness of from 0.03 to 0.06 mm, measured from a center line of a roughness profile of the inner lateral surface;

congruently combining the metal blades with their inner lateral surfaces facing each other to form a sandwich structure;

thermally hardening the adhesive comprising, in a first hardening stage, heating at a temperature ranging from 50° C. to 70° C. and a pressure ranging from 1 to 3 kg/cm² for a period of 10 to 16 minutes, cooling to ambient temperature, and heating, in a second hardening stage, at a temperature ranging from 140° C. to 160° C. to complete the hardening of the adhesive; and treating the outer lateral surfaces of the metal blades by at least one of brush polishing and circular polishing to provide them with a surface roughness represented by a maximum profile height $R_z$ of 5 to 10 μm.

29. The process of claim 28, wherein the saw blade has at least one of slots and teeth in the area of its outer circumference and wherein the process further comprises securing cutting elements selected from cutting segments, cutting tips and combinations thereof to circumferential surfaces between said at least one of slots and teeth.

30. The process of claim 29, wherein the cutting elements are secured by metallic bonding.

31. The process of claim 30, wherein said metallic bonding comprises at least one of soldering and welding.

32. A circular saw blade obtainable by a process comprising:

providing at least two circular-saw-shaped metal blades made from heat-treated sheet material of iron-based alloy, each metal blade having an outer lateral surface and an inner lateral surface;

partially plastically deforming the metal blades all around in the area of their half radius;

treating the inner lateral surfaces of the metal blades to provide them with a roughness according to EN ISO 4287 and EN ISO 4288 (DIN 4267) represented by a maximum profile height $R_z$ of 3.0 to 7.0 μm and an arithmetic mean roughness index $R_a$ of 0.30 to 0.75 μm;

applying an adhesive onto the inner lateral surface of at least one of the metal blades;

combining the metal blades with their inner lateral surfaces facing each other to form a sandwich structure;

thermally hardening the adhesive while applying pressure to the sandwich structure; and treating the outer lateral surfaces of the metal blades to provide them with a surface roughness represented by a maximum profile height $R_z$ of 5 to 10 μm.

33. The saw blade of claim 32, wherein the saw blade has at least one of slots and teeth in the area of its outer circumference and wherein the process further comprises securing cutting elements selected from cutting segments, cutting tips and combinations thereof to circumferential surfaces between said at least one of slots and teeth.

34. The saw blade of claim 33, wherein the cutting elements are secured by metallic bonding.

35. The saw blade of claim 34, wherein the inner and outer lateral surfaces are treated by at least one of brush polishing and circular polishing.

36. The saw blade of claim 32, wherein the iron-based alloy comprises, in weight percent:

| 0.6  | to | 0.9 C    |
| 0.15 | to | 0.7 Si   |
| 0    | to | 1.0 Mn and |
| 0.20 | to | 0.60 Cr, | the balance being iron and incidental impurities, with the contents of phosphorus and sulfur each not exceeding 0.03 percent by weight.

37. The saw blade of claim 36, wherein the saw blade has at least one of slots and teeth in the area of its outer circumference and wherein cutting elements selected from cutting segments, cutting tips and combinations thereof are soldered to circumferential surfaces between said at least one of slots and teeth.

38. The saw blade of claim 32, wherein the iron-based alloy comprises, in weight percent:

| 0.18 | to | 0.35 C    |
| 0    | to | 0.50 Si   |
| 0    | to | 1.40 Mn   |
| 0.30 | to | 1.55 Cr and |
| 0    | to | 0.40 Mo,  | the balance being iron and incidental impurities, with the contents of phosphorus and sulfur each not exceeding 0.03 percent by weight.

39. The saw blade of claim 38, wherein the saw blade has at least one of slots and teeth in the area of its outer circumference and wherein cutting elements selected from cutting segments, cutting tips and combinations thereof are welded to circumferential surfaces between said at least one of slots and teeth.

* * * * *